Nov. 7, 1933.                H. E. FRETZ                1,934,600
                            SADDLE SUPPORT
                         Filed May 16, 1931
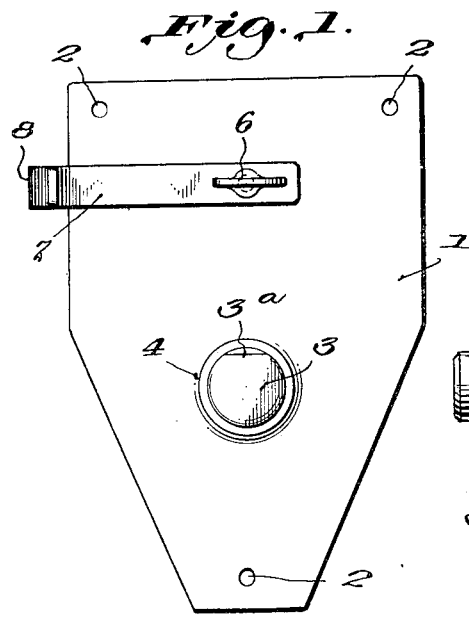
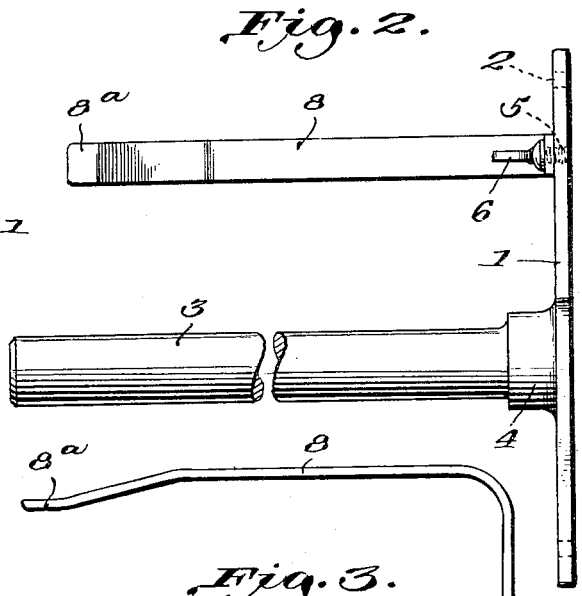
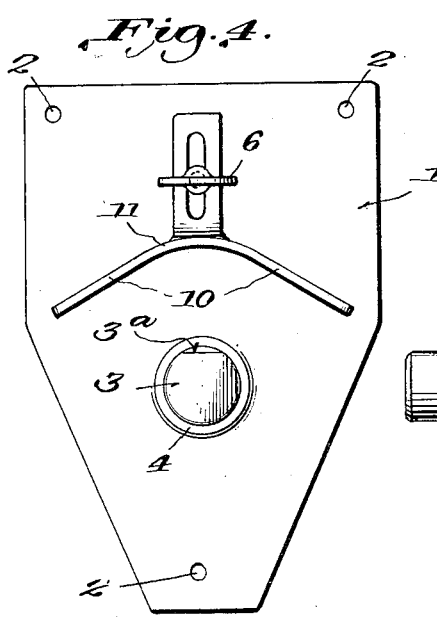
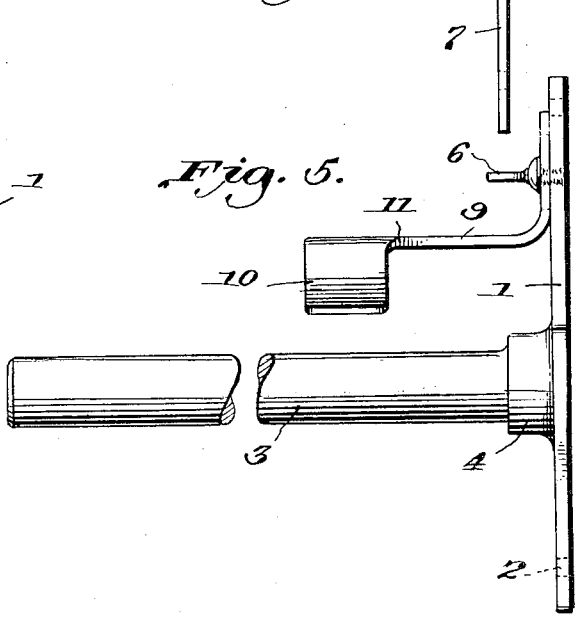
Inventor
Homer E. Fretz
By Stone, Boyden, Mack & Hahn
Attorneys.

Patented Nov. 7, 1933

1,934,600

UNITED STATES PATENT OFFICE 1,934,600

SADDLE SUPPORT

Homer E. Fretz, Newton Square, Pa.

Application May 16, 1931. Serial No. 537,956

1 Claim. (Cl. 248—30)

This invention relates to saddle supports. It relates more particularly to that type of support on which saddles are temporarily hung while not actually in use.

While it is customary to support saddles on a substantially horizontal rod, this means is not entirely satisfactory, because the saddles are easily dislodged. It is practically impossible to support side saddles in this manner because of their unsymmetrical design.

It is an object of this invention to provide a support in which the saddle will be retained positively in a natural and upright position.

Another object of the invention is to provide a saddle support which may be adapted to retain side saddles or the conventional form of saddles used for riding astride.

Another object of the invention is to provide a support which will have a maximum amount of the under surface of the saddle exposed to the air in order that it may dry more readily.

Further objects of the invention will become apparent from the following specification and appended claim.

With reference to the drawing Figure 1 is a front view of the support adapted for side saddles;

Figure 2 is a side view of the support shown in Figure 1;

Figure 3 is a plan view of the pommel supporting member used in the support shown in Figures 1 and 2;

Figure 4 is a front view of the support adapted for supporting saddles of the conventional type; and Figure 5 is a side view of the support shown in Figure 4.

With more particular reference to the drawing, the support comprises a plate 1, provided with means for securing it to a wall or post, such as by passing bolts or screws through the holes 2. The saddle supporting member 3 is made from a short section of pipe or a piece of wood and is secured to the plate 1, by means of the outwardly extending cylindrical boss 4. The member 3 may be flattened as shown at 3a in order to better retain the saddle.

Directly above the supporting member 3, in the plate 1, is provided means for attaching the pommel supporting member such as an internally threaded hole 5 fitted with the wing screw 6.

The pommel supporting member may be of either of two forms, depending on what type of saddle is to be retained. In the form used for side saddles, it may consist of a strip 7, of metal lying parallel and adjacent to the plate 1, bent at right angles, the outer end 8 of the strip being bent slightly inwardly toward the saddle to provide a shallow hook which will substantially conform to the contour of the side saddle pommel. It should be noted that the member 7 is pivotally adjustable about the wing screw 6, hence side saddles of various sizes and construction can be accommodated.

The pommel supporting member 11, designed for saddles used for riding astride consists of a T shaped piece of metal 9, the central or tongue portion of which is bent at right angles to the remainder and the wing portions 10, are bent downwardly, to substantially conform to the contour of an ordinary saddle pommel. The tongue portion 9 is slotted to receive the wing screw 6, thus providing vertical adjustment of the pommel supporting member to allow for saddles of varying heights of pommel in any event, the pommel supporting member extends from the wall plate alongside of the saddle supporting arm.

In the Figures 4 and 5 it will be seen that a saddle placed upon the supporting rod 3 will be held vertical by the depending portions 10 of the pommel supporting member 11.

It will be noted that when it is desired to use the support shown in Figures 4 and 5 for side saddles, all that is necessary is to replace the member 11, with the pommel supporting member shown in Figure 3.

What I claim is:—

A saddle support comprising a wall plate, a horizontal saddle supporting arm projecting therefrom substantially the length of the saddle, a pommel supporting member detachably and adjustably secured to said wall plate, said pommel supporting member having a portion lying along said wall plate, a portion extending from said wall plate substantially parallel to and to one side of said saddle supporting arm and an end portion curved, to engage the side of a side saddle pommel and retain the saddle in an upright position and prevent longitudinal movement thereof.

HOMER E. FRETZ.